United States Patent [19]

Hamby, Jr.

[11] Patent Number: 4,749,012

[45] Date of Patent: Jun. 7, 1988

[54] SELF-ALIGNING CUTTER HEAD ASSEMBLY FOR DELIMBING TREES

[76] Inventor: Thomas E. Hamby, Jr., Rte. 1, Box 27A, Purlear, N.C. 28665

[21] Appl. No.: 59,604

[22] Filed: Jun. 8, 1987

[51] Int. Cl.⁴ .............................................. A01G 23/00
[52] U.S. Cl. ..................................... 144/2 Z; 144/343
[58] Field of Search ................... 144/2.2, 3 D, 208 R, 144/343

[56] References Cited

U.S. PATENT DOCUMENTS

| | | | |
|---|---|---|---|
| 3,183,949 | 5/1965 | Larson | 144/3 D |
| 3,398,774 | 8/1968 | Hahn . | |
| 3,443,611 | 5/1969 | Jorgensen . | |
| 3,572,410 | 3/1971 | McElderry | 144/2 Z |
| 3,643,708 | 2/1972 | Lindblom . | |
| 3,763,904 | 10/1973 | Eynon | 144/2 Z |
| 3,809,134 | 5/1974 | McCabe . | |
| 3,881,532 | 5/1975 | Jouppi | 144/2 Z |
| 3,905,407 | 9/1975 | Guy et al. . | |
| 3,981,336 | 9/1976 | Levesque . | |
| 4,034,785 | 7/1977 | Tucek | 144/2 Z |
| 4,049,032 | 9/1977 | Oldenburg et al. | 144/2 Z |
| 4,050,486 | 9/1977 | Whitcomb . | |
| 4,114,666 | 9/1978 | Bruun | 144/2 Z |
| 4,124,047 | 11/1978 | Dressler et al. | 144/2 Z |
| 4,258,762 | 3/1981 | Belanger . | |
| 4,462,438 | 7/1984 | Gaudreault . | |
| 4,620,578 | 11/1986 | Verrill et al. . | |

Primary Examiner—W. Donald Bray
Attorney, Agent, or Firm—Bell, Seltzer, Park & Gibson

[57] ABSTRACT

The present cutter head assembly includes guide lever members engageable with the trunk of the tree so that the curved cutting and limb stripping blades are maintained parallel with the longitudinal axis of the tree as the tree is pulled through the cutter head assembly by the grapple of a knuckle boom loader or the like. The cutter head assembly includes a rectangular support frame with a pair of curved cutting and limb stripping blades pivotally supported for movement toward and away from each other and adjacent one end of the rectangular support frame. The stripping blades define a tree encircling cutting opening therebetween for longitudinal movement of the tree in one direction through the cutting opening. A pair of curved guide levers is pivotally supported for movement toward and away from each other and adjacent the other end of the rectangular support frame. The rectangular support frame is supported for a limited amount of pivotal movement in both vertical and horizontal planes so that the support frame and the curved stripping blades and guide levers are automatically maintained in alignment with the tree trunk so that the axial alignment of the cutter head is not dependent upon the skill of the operator of the knuckle boom loader.

10 Claims, 3 Drawing Sheets

SELF-ALIGNING CUTTER HEAD ASSEMBLY FOR DELIMBING TREES

FIELD OF THE INVENTION

This invention relates generally to a self-aligning cutter head assembly for delimbing trees and more particularly to such a cutter head assembly including curved guide levers in encircling engagement with the trunk of the tree so that curved cutting and limb stripping blades are automatically maintained parallel with the longitudinal axis of the tree as the tree is pulled through the cutter head assembly by the grapple of a knuckle boom loader.

BACKGROUND OF THE INVENTION

It is generally known to delimb trees by encircling the tree trunk with curved blade members and either moving the curved blade members along the length of the tree, or pulling the tree in a longitudinal direction through the curved blade members. In some cases, the delimbing device forms a part of a tree harvester and is supported for vertical movement on a track. The delimbing device moves up the track adjacent a standing tree to remove the limbs. An example of this type of delimbing device is disclosed in U.S. Pat. No. 3,183,949.

In other instances, the delimbing device is supported in a horizontal position and moves along a track while the tree is held in a horizontal position. Examples of such a tree delimbing apparatus are disclosed in U.S. Pat. Nos. 3,905,407 and 4,462,438.

U.S. Pat. No. 3,443,611 discloses a telescopic boom on which the delimbing device is attached. The telescopic boom moves the delimbing device along the length of the tree while the top of the tree is held by the inner-most portion of the telescopic boom.

U.S. Pat. Nos. 3,398,774 and 4,258,762 disclose tree delimbing apparatuses in which the limb cutting head assembly is fixed in a horizontal position on a frame. The tree is then longitudinally pulled through the limb cutting head assembly by gripping jaws which are supported for movement along a horizontal track arrangement. The type of tree harvester and delimbing apparatus of the type disclosed in the patents identified above are very large and expensive and involve complicated mechanisms which are difficult to maintain in proper operating condition. Also, it is many times difficult, if not impossible, to maneuver this type of large equipment into position adjacent the particular trees to be delimbed and harvested, particularly in hilly and rough terrain.

Recognizing the problems associated with the devices disclosed in the above-identified patents, U.S. Pat. No. 4,620,578 discloses a very simple and inexpensive tree delimber adapted to be used in conjunction with a grapple equipped crane or knuckle boom loader. The delimbing device of this patent is supported in a fixed position on a trailer and includes a pair of semi-circular lower cutting blade jaws with a single semi-circular upper cutting jaw pivotally mounted between the lower jaws. The upper cutting jaw is swingable between a closed position and an open position and is maintained in engagement with the upper portion of the tree by gravity as the tree is drawn through the delimber. The delimbing device of this patent overcomes many of the problems of the large complicated devices of the other prior art, in that it is very inexpensive to construct and maintain. However, the operation of the delimber of this patent requires accurate control by the grapple crane operator to draw the tree in perfect alignment in an axial direction through the delimber throughout the entire length of travel of the tree through the delimber. If axial alignment is not accurately maintained as the tree is drawn through the fixed blades, the blades will dig into and cut the side of the tree trunk. When the blades dig into the tree trunk, the operator must reverse the direction of movement of the tree trunk to free the blades from cutting engagement therewith and then continue to pull the tree through the delimber while maintaining accurate longitudinal axial alignment with the cutting blades.

SUMMARY OF THE INVENTION

With the foregoing in mind, it is an object of the present invention to provide a self-aligning cutter head assembly for delimbing trees which is simple in construction, inexpensive to manufacture and maintain, and which is particularly adapted for use in conjunction with a knuckle boom loader for drawing a tree trunk in a longitudinal direction through the cutter head assembly without requiring the knuckle boom load operator to maintain accurate longitudinal axial alignment with the cutter head assembly.

The self-aligning cutter head assembly of the present invention includes a rectangular support frame with a pair of curved cutting and limb stripping blades pivotally supported for movement toward and away from each other and adjacent one end of the rectangular support frame. The pivotal curved stripping blades, along with a fixed curved blade, define a tree encircling cutting opening therebetween for longitudinal movement of a tree in one direction through the cutting opening. Additionally, a pair of curved guide levers is pivotally supported for movement toward and away from each other and adjacent the other end of the rectangular support frame with the guide levers defining a tree encircling guide opening therebetween for axial movement of the tree trunk through the guide opening.

The rectangular support frame is supported to provide a limited amount of pivotal movement in both vertical and horizontal planes so that the support frame and the curved stripping blades and guide levers are maintained in alignment with the tree trunk as the tree is drawn through the respective cutting and guiding openings at opposite ends of the rectangular support frame. This mounting of the rectangular support frame for pivotal movement in both vertical and horizontal planes provides the self-aligning feature for the cutter head assembly and automatically maintains the limb stripping blades in axial alignment with the tree as it is drawn therethrough so that axial alignment of the cutter head is not dependent upon the skill of the operator of the knuckle boom loader.

Guide rails are supported on and extend upwardly from the rectangular support frame for aiding the knuckle boom loader operator in positioning the tree in the cutter head assembly. The curved limb stripping blades and the curved guide levers are urged inwardly into tree encircling engagement with the tree trunk by springs so that they are resiliently maintained in the proper relationship around the tree trunk as the diameter of the tree trunk reduces when the tree is drawn through the cutter head assembly from the butt direction. Hydraulic cylinders operate to open the curved limb stripping blades and the curved guide levers for initial receipt of the tree therein. A gear train drivingly interconnects the curved limb stripping blades and the curved guide levers to insure equal inward and outward pivoting movement of each of these elements of the cutter head assembly.

The operation of the hydraulic cylinders for moving the curved limb stripping blades and the curved guide levers to the open position are operated from the hydraulic pump normally provided on the knuckle boom loader. Hydraulic pressure supply lines which are easily connectable between the pump and the cylinders and a simple operating lever is positioned on the knuckle boom loader for easy access by the operator thereof.

A spring and chain is connected between the rectangular support frame and the support for the cutter head assembly to limit the amount of horizontal rotation of the rectangular support frame so that the cutter head assembly is returned to and maintained in a substantially centered position after the completion of each delimbing operation. Limiting means is also provided for limiting the amount of pivotal movement of the rectangular support frame in the vertical plane so that the cutter head assembly is returned to and maintained in substantially a horizontal position following each delimbing operation. Thus, the cutter head assembly is conveniently positioned to receive a tree therein following each delimbing operation.

BRIEF DESCRIPTION OF THE DRAWINGS

Other objects and advantages will appear as the description proceeds when taken in connection with the accompanying drawings, in which.

DESCRIPTION OF THE ILLUSTRATED EMBODIMENT

Figure 1:
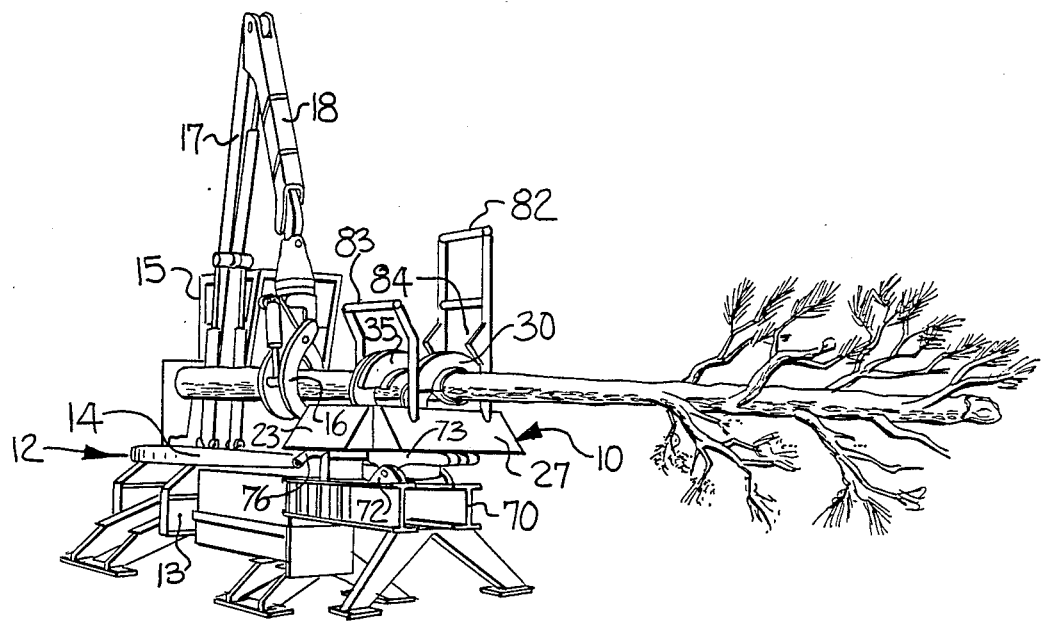
FIG. 1 is a perspective view of the cutter head assembly supported on one end of a knuckle boom loader and illustrating a tree trunk being pulled through the cutter head assembly by the grapple of the knuckle boom loader.

The self-aligning cutter head assembly of the present invention, broadly indicated at 10 in FIG. 1, is supported on an extension of one end of a knuckle boom loader, broadly indicated at 12. The knuckle boom loader 12 may be of any suitable type and includes a lower frame 13 supporting a pivotal platform 14 on which is mounted a suitable operator enclosure 15 and a boom or crane arms 17, 18 supporting a grapple 16 on the outer end thereof. The boom arms 17, 18 are operated in the usual manner by means of the usual hydraulic cylinders.

The knuckle boom loader 12 is normally employed to lift felled and delimbed trees to either cut them in predetermined lengths and place them on a truck for transportation or to lift full length trees and place them on a truck for transportation. The trees are normally skidded or dragged from the forest to a point adjacent the knuckle boom loader 12, after having had the limbs cut therefrom in the woods by a hand chain saw operation, and are piled in a convenient location adjacent the knuckle boom loader 12. By providing the self-aligning cutter head assembly 10 on the knuckle boom loader 12, the operator can carry out the delimbing operation in an efficient and economical manner by simply drawing the tree through the cutter head assembly after the tree is lifted from the stack of trees to be loaded. The delimbed tree may then be positioned on the length cutter, not shown, and then the cut length is loaded on the truck, or the whole delimbed tree can be directly loaded on a truck positioned adjacent the knuckle boom loader 12.

Figure 3:
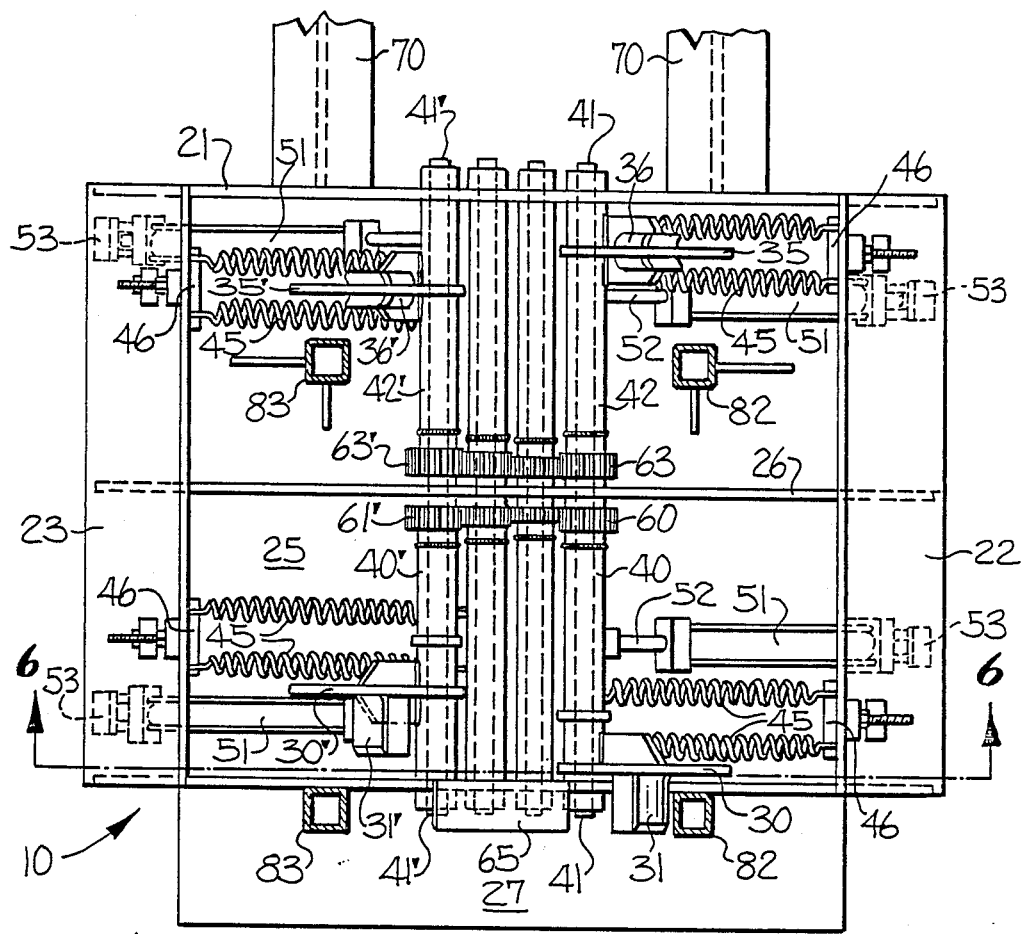
FIG. 3 is a sectional plan view of the cutter head assembly, with the cover plate removed, and with the limb stripping blades and guide levers in open position to receive a tree trunk therein.
Figure 5:
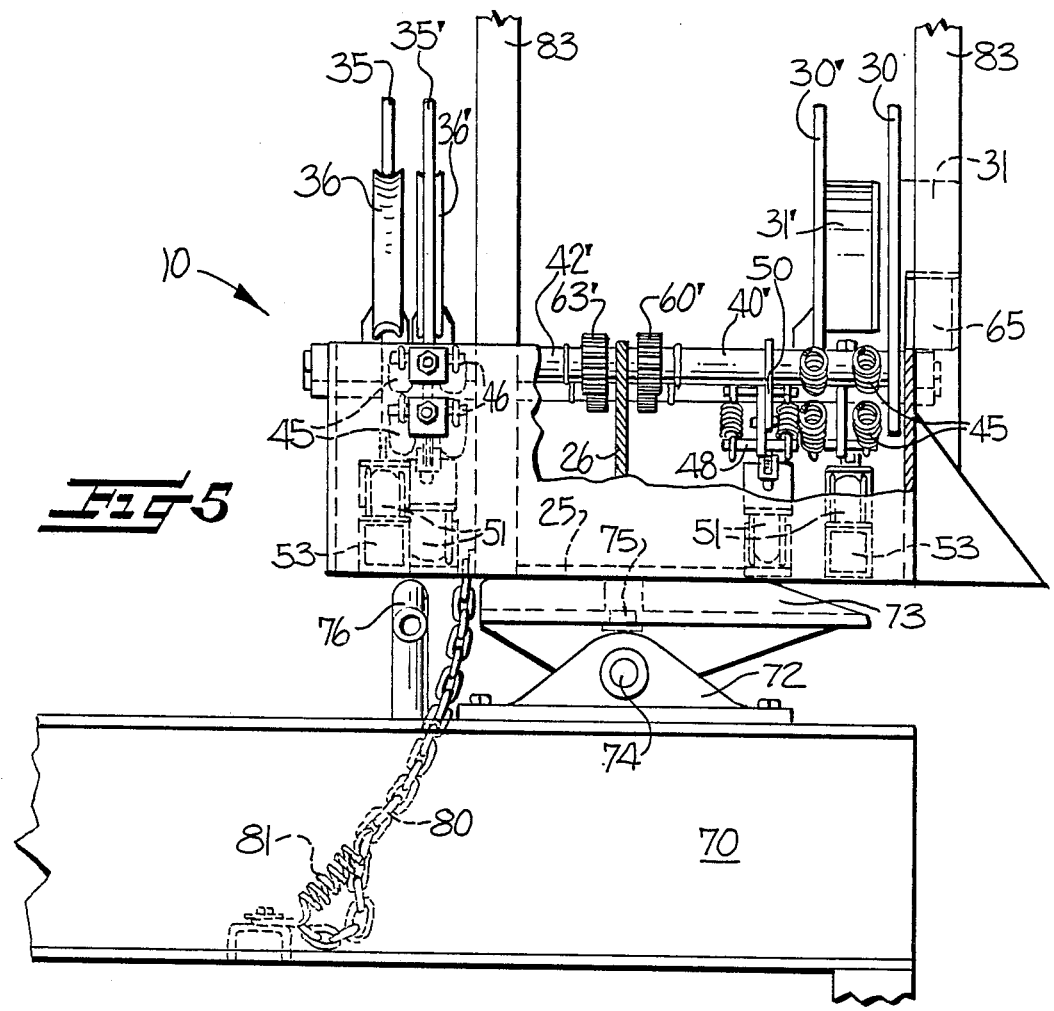
FIG. 5 is a left side elevational view of the rectangular support frame looking at the left-hand side of FIG. 3.

The self-aligning cutter head assembly 10 includes a rectangular support frame including respective front and rear end walls 20, 21 (FIG. 3), opposite inwardly inclined side walls 22, 23, an upper cover plate 24 (FIG. 6), a bottom support plate 25, and a central vertically positioned support wall 26 extending across and suitably connected at opposite ends to the opposite side walls 22, 23. The front wall 20 is provided with a downwardly slanting limb deflecting shield 27 (FIGS. 3 and 5).

Curved cutting and limb stripping levers 30, 30' are pivotally supported adjacent their lower ends for movement toward and away from each other and adjacent the front end of the rectangular support frame. The curved cutting and limb stripping levers 30, 31 have curved blades 31, 31' fixed to their inner curved surfaces and collectively defining a tree encircling cutting opening therebetween for longitudinal movement of the tree trunk in one direction through the cutting opening, as illustrated in FIG. 1. Curved tree trunk guide levers 35, 35' (FIGS. 3 and 5) are pivotally supported adjacent their lower ends for movement toward and away from each other and adjacent the rear end of the rectangular support frame. The inner curved surfaces of the guide levers 35, 35' are provided with respective curved guide plates 36, 36' and define a tree encircling guide opening therebetween for axial movement of the tree trunk through the guide opening, as illustrated in FIG. 1.

The lower end portions of the curved limb stripping levers 30, 30' are fixed on respective tubular sleeve members 40, 40' (FIG. 3), supported for rotational movement on respective support shafts 41, 41' which extend through and are supported in the front wall 20, the rear wall 21, and the intermediate support wall 26. The lower end portions of the guide levers 35, 35' are fixed on respective tubular sleeve members 42, 42', supported for rotation on the rear portions of the support shafts 41, 41'.

Figure 2:
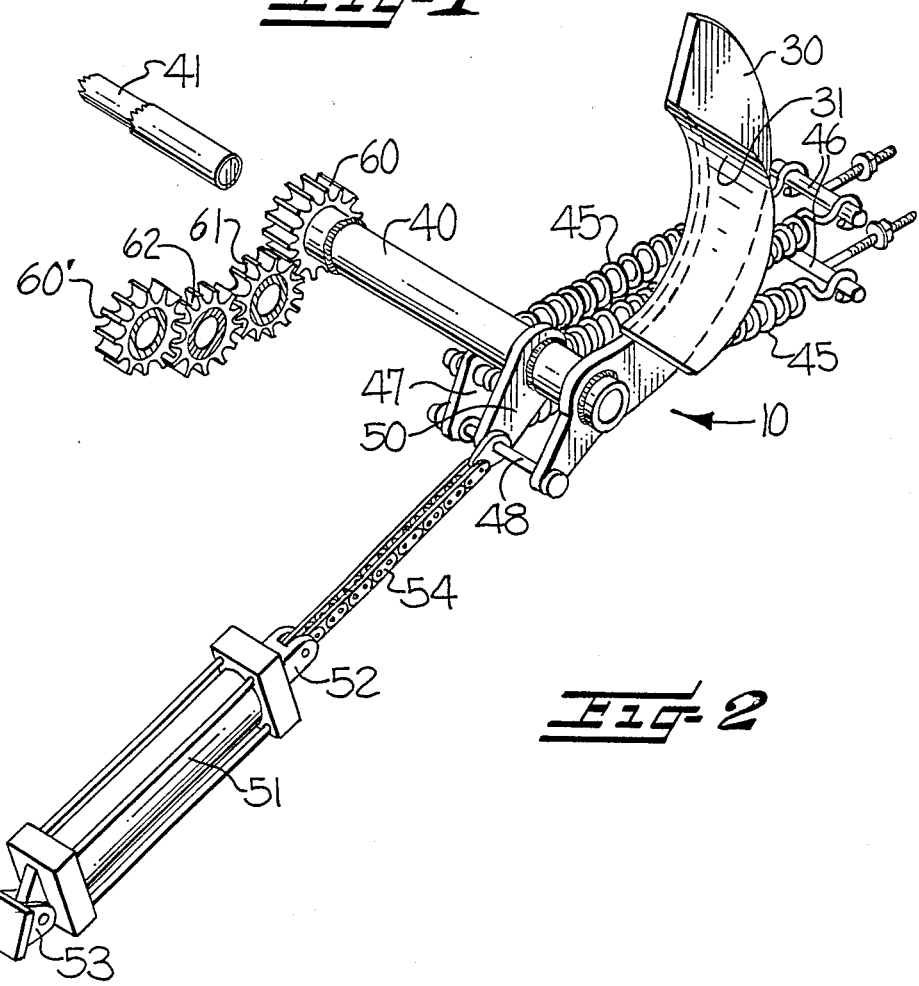
FIG. 2 is a fragmentary isometric view of one of the curved cutting and limb stripping blade lever arms and illustrating the manner in which it is urged inwardly toward the tree trunk by tension springs and moved outwardly by a hydraulic cylinder.

The curved stripping levers 30, 30', as well as the curved guide levers 35, 35', are resiliently urged toward each other by sets of upper and lower tension springs 45, the outer ends of which are connected to T-shaped spring perches 46 which extend outwardly through the respective opposite side walls 22, 23 and are threaded to receive an adjustment nut thereon. Thus, the threaded outer ends of the T-shaped spring perches 46 provide means for adjusting the tension of the tension springs normally urging the stripping levers 30, 30' and the guide levers 35, 35' inwardly toward each other in surrounding and encircling relationship with the tree trunk. The inner ends of the sets of tension springs 45 are fixed to a yoke plate 47 which is in turn supported on a horizontally extending operating pin 48 (FIG. 2). The operating pin 48 extends through the lower end of each of the stripping levers 30, 30' and the guide levers 35, 35', as best shown in FIG. 2 in association with the stripping lever 30. The operating pin 48 also extends through an auxiliary lever arm 50 which surrounds and is fixed to the tubular sleeve member 40 at its upper end.

Figure 4:
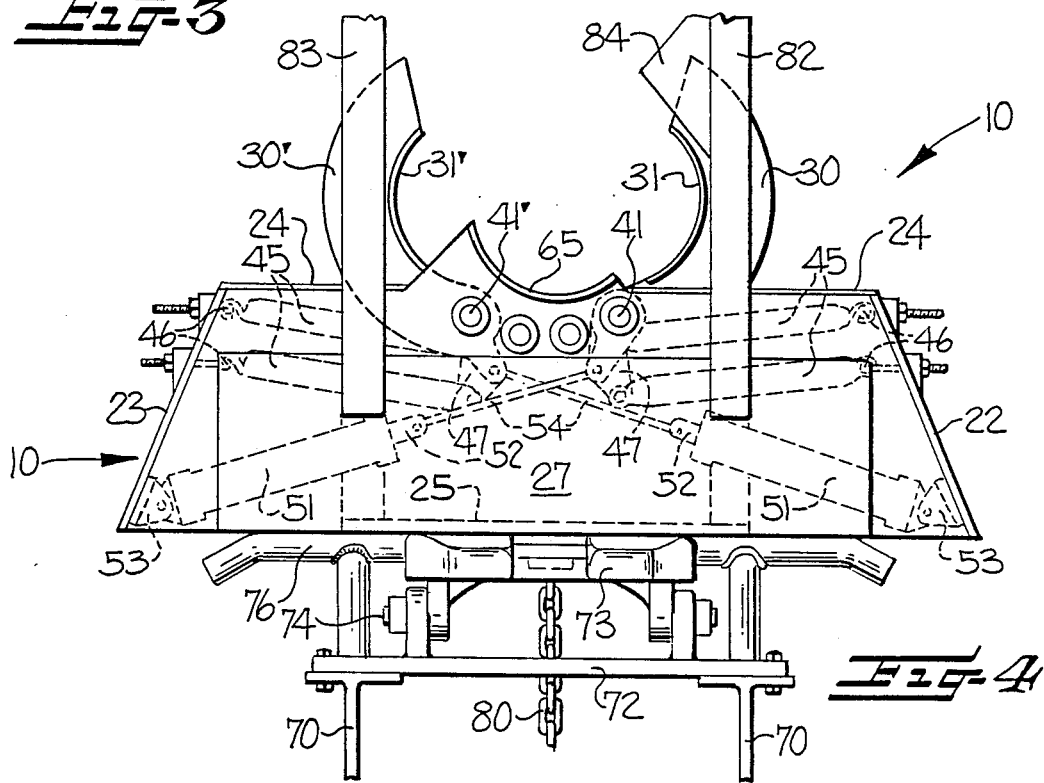
FIG. 4 is a front elevational view, looking at the lower side of the rectangular support frame of FIG. 3.
Figure 6:
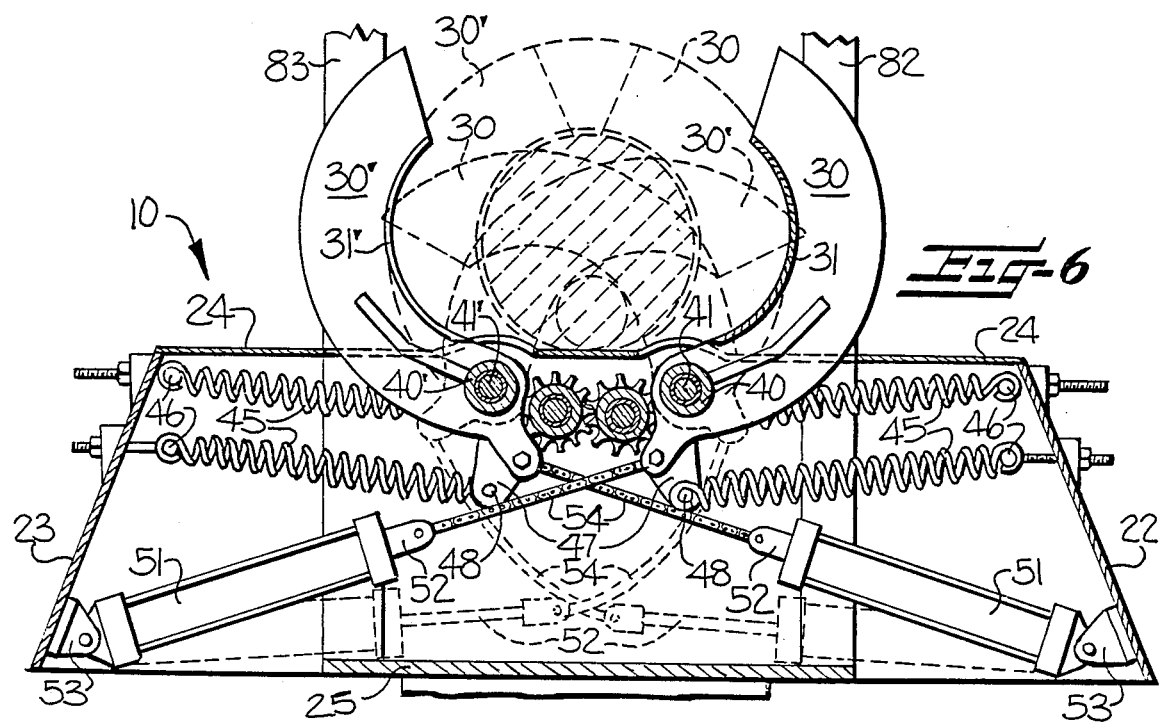
FIG. 6 is an enlarged vertical sectional view taken substantially along the line 6—6 in FIG. 3.

The limb stripping levers 30, 30' and the guide levers 35, 35' are moved outwardly away from each other to the open position shown in FIGS. 2, 4 and 6 by corresponding hydraulic cylinders 51 provided with operating piston rods 52. The outer ends of the hydraulic cylinders 51 are pivotally supported on support brackets 53 fixed on the opposite side walls 22, 23 and the inner ends of the piston rods 52 are connected to the outer ends of operating sprocket chains 54. The inner ends of the sprocket chains 54 are connected to the operating pin 48. The hydraulic cylinders 51 are connected to hydraulic pressure supply lines, not shown, extending from the knuckle boom loader 12 and operated by a suitable manual valve controlled by the knuckle boom loader operator in preparation for positioning a tree trunk in the cutter head assembly 10 for delimbing the same.

In order to insure uniform inward and outward movement of the stripping levers 30, 30', respective spur gears 60, 60' are fixed on the tubular sleeve members 40, 40' and positioned adjacent the intermediate support wall 26 (FIG. 3). The spur gears 60, 60' are drivingly interconnected by a pair of idler spur gears 61, 62 (FIG. 2). Spur gears 63, 63' are fixed on the sleeve members 42, 42' and are drivingly interconnected by idler spur gears similar to the idler spur gears 61, 62 (FIG. 3). The spur gears 63, 63' insure uniform inward and outward movement of the guide levers 35, 35'.

A curved fixed cutting and limb stripping blade 65 (FIGS. 3 and 4) is fixed on and extends upwardly above the front wall 20. The fixed blade 65 cooperates with the curved blades 31, 31' to encircle the tree trunk and complete the cutting opening through which the tree trunk passes.

Means is provided for supporting the rectangular support frame for a limited amount of pivotal movement in both the vertical and horizontal planes. As illustrated in FIG. 1, the cutter head assembly 10 is supported on a frame extension 70 of the knuckle boom loader 12 by means of a "fifth-wheel" connection including a base plate 72 (FIGS. 4 and 5) fixed on the frame extension 70 and a pivot plate 73 pivotally connected to the base plate 72 as by pivot pins 74 to provide pivotal movement of the pivot plate 73 in a vertical plane. A vertically extending pivot pin 75 (FIG. 5) is fixed at its upper end on the base plate 25 and extends downwardly therefrom. The pivot pin 75 is releasably connected to the pivot plate 7 to provide pivotal movement of the cutter head assembly in a horizontal plane.

The amount of pivotal movement in the vertical plane of the cutter head assembly 10 is limited by a stop bar 76 (FIGS. 4 and 5) which is supported in spaced relationship above and on the frame extension 70. The stop bar 76 is engaged by the downstream or rear side of the rectangular frame so that it will not pivot substantially below the horizontal level position shown in FIG. 5, but is free to pivot in the vertical plane downwardly from the position shown in FIG. 5 during the limb stripping operation.

Pivotal movement of the cutter head assembly 10 in the horizontal plane is limited by a length of chain 80 (FIG. 5), the upper end of which is suitably connected to the rear portion of the rectangular frame and the lower end of which is connected to the frame extension 70. A tension spring 81 is connected between the lower end of the chain and a medial portion thereof to provide resilient means in the length of chain 80. The chain 80 and spring 81 act as a self-centering device to permit a limited amount of pivoting movement in the horizontal plane and to return the rectangular frame to a position substantially in alignment with the knuckle boom loader frame, as shown in FIGS. 3-5, after completion of the limb stripping operation.

Substantially inverted U-shaped guide bars 82, 83 have their lower ends fixed on the rectangular support frame and extend upwardly beside and adjacent the respective cutting and limb stripping levers 30, 30' and the guide levers 35, 35'. These guide bars 82, 83 are used to aid in guiding the tree trunk into the proper position for limb stripping, in a manner to be presently described. The inner surfaces of the medial portions of the vertical legs of the guide bar 82 are provided with inwardly extending cam plates 84 for further aiding in guiding the tree trunk into the proper position for encircling engagement by the curve cutting and stripping levers 30, 30' and the guide levers 35, 35'.

METHOD OF OPERATION

In the normal tree harvesting operation, the trees are felled, usually with a chain saw, and then the limbs are cut from the trunk of the tree in a position where the tree is felled, again by a manually operated chain saw. This manual delimbing operation adds to the cost of harvesting the trees because it requires additional time on the part of the person cutting the trees. The trees are then dragged or skidded to a loading location by a skidder to be either cut in the desired length and loaded on a truck or they are loaded in full tree length condition by means of a knuckle boom loader or the like. By employing the self-aligning cutter head assembly 10 of the present invention, it is no longer necessary for the tree cutter to also carry out the delimbing operation and the trees are felled and skidded to the knuckle boom loader 12 with the limbs remaining thereon.

The knuckle boom loader operator operates the hydraulic valve to actuate and move the piston rods 52 inwardly of the hydraulic cylinders 51 so that both the curved cutting and limb stripping levers 30, 30' and the guide levers 35, 35' are separated and moved outwardly to the open position, as illustrated in FIGS. 4 and 6, with the interconnecting gears 60-63 insuring that the levers are moved outwardly in a uniform manner. The operator then picks up a tree to be delimbed by the grapple 16 engaging the butt end portion of the tree. The tree is lifted to a position above the level of the self-aligning cutter head assembly 10 and the butt end is then lowered into position in engagement with the curved cutting blade 65 and between the open limb stripping levers 30, 30' and guide levers 35, 35', as illustrated in cross section in FIG. 6.

When the butt end portion of the tree is positioned in the cutter head assembly 10, the cutter head assembly will pivot in both the vertical and horizontal positions to be automatically aligned with the longitudinal axis of the tree. The operator then releases the hydraulic pressure on the hydraulic cylinders 51 so that the tension springs 45 move the cutting and limb stripping levers 30, 30' and the guide levers 35, 35' inwardly in a uniform manner on opposite sides of the tree trunk to encircle and resiliently engage the outer diameter of the tree. The operator of the knuckle boom loader then draws the tree through the cutter head assembly by moving the grapple 16 away from the cutter head assembly 10 and the blades 31, 31' and 65 engage and strip any outwardly extending limbs from the tree trunk while the guide levers 35, 35' automatically maintain the cutter head assembly 10 aligned with the longitudinal axis of the tree to prevent the blades from digging into the tree and jamming the cutter blades. Thus, the operator does not have to be concerned with moving the grapple 16 along a predetermined path but can simply pull the tree through the cutter head assembly without requiring any particular skill. The cutter head assembly 10 pivots in both the vertical and horizontal planes an amount sufficient to automatically remain in longitudinal alignment with the tree trunk.

After the tree has been pulled through the cutter head assembly 10 and the limbs stripped therefrom, the knuckle boom loader operator can then position the tree in position in a cutting cradle to cut predetermined lengths of the tree and load these individually cut lengths onto a truck. Alternatively, the knuckle boom loader operator can directly load the delimbed tree trunk onto a truck, if the entire tree is to be transported to the logging operation.

As illustrated in dotted lines in FIG. 6, the curved cutting and limb stripping levers 30, 30' are initially moved in and resiliently held in encircling relationship with the full size tree trunk. As the tree trunk is drawn through the cutter head assembly 10 from the butt end to the top end, the diameter of the tree trunk gradually reduces and the curved cutting and limb stripping levers 30, 30' are moved inwardly and resiliently maintained in engagement therewith by the springs 45 until the tree trunk is reduced in diameter to approximately three inches, as illustrated by the small dotted line circle in FIG. 6.

Thus, the knuckle boom loader operator is required to acquire no special skill or training to use the cutter head assembly of the present invention and delimbs the tres by merely positioning the tree in the cutter head assembly and drawing the same therethrough. The limb stripping operation is thus carried out by merely drawing the tree through the cutter head assembly as it is lifted in its normal manner to place the tree on a transporting truck or the like. The limited amount of pivotal movement in both the vertical and horizontal planes by the cutter head assembly thus insures that the curved cutting and limb stripping blades and the curved guide levers are automatically maintained in alignment with the longitudinal axis of the tree trunk as it is moved through the cutter head assembly so that the tree limbs are quickly and efficiently removed therefrom.

In the drawings and specification there has been set forth the best mode presently contemplated for the practice of the present invention, and although specific terms are employed, they are used in a generic and descriptive sense only and not for purposes of limitation, the scope of the invention being defined in the claims.

That which is claimed is:

1. A self-aligning cutter head assembly for delimbing trees comprising a rectangular support frame including front and rear ends, and opposite sides, a pair of curved cutting and limb stripping levers pivotally supported for movement toward and away from each other and adjacent one end of said rectangular support frame, said stripping levers including curved blades fixed thereto and defining a tree encircling cutting opening therebetween for longitudinal movement of a tree in one direction through the cutting opening, a pair of curved guide levers pivotally supported for movement toward and away from each other and adjacent the other end of said rectangular support frame, said curved guide levers defining a tree encircling guide opening therebetween for axial movement of the tree trunk through the guide opening, means supporting said rectangular support frame for a limited amount of pivotal movement in both the vertical and horizontal planes so that said rectangular support frame and said curved cutting and limb stripping blades and said curved guide levers are maintained in alignment with the longitudinal axis of the tree trunk as the tree trunk moves through the respective cutting and guiding openings at opposite ends of said rectangular support frame, and wherein said means for limiting pivotal movement in the horizontal plane includes resilient means connected at one end to said support means and at the other end to said rectangular support frame for limiting the amount of pivotal movement of said rectangular support frame in the horizontal plane and for returning said rectangular support frame to a centered position after completion of a delimbing operation.

2. A self-aligning cutter head assembly according to claim 1 including resilient means operatively connected to said curved cutting and limb stripping levers and to said curved guide levers to resiliently urge the same inwardly into tree encircling relationship with the tree trunk as it is drawn through the cutter head assembly.

3. A self-aligning cutter head assembly according to claim 1 including actuator means connected to said curved cutting and limb stripping levers and to said curved guide levers for positively moving the same outwardly to an open position in preparation for receiving a tree trunk in said cutter head assembly.

4. A self-aligning cutter head assembly according to claim 3 wherein said actuator means comprises hydraulic cylinders operatively connected to said curved cutting and limb stripping levers and said curved guide levers for imparting positive outward movement to said curved cutting and limb stripping levers and said curved guide levers.

5. A self-aligning cutter head assembly according to claim 2 including positive drive means interconnecting said pair of curved cutting and limb stripping levers, and positive drive means interconnecting said pair of curved guide levers to insure uniform inward and outward pivotal movement of both said curved cutting and limb stripping levers and said curved guide levers.

6. A self-aligning cutter head assembly according to claim 1 wherein said means supporting said rectangular support frame for a limited amount of pivotal movement in both the vertical and horizontal planes includes a base plate supported in a fixed position, a pivot plate supported on said base plate for pivotal movement in a vertical plane, and a pivot pin fixed on said rectangular support frame and supported on said pivot plate for pivotal movement in a horizontal plane.

7. A self-aligning cutter head assembly according to claim 6 wherein said means for limiting pivotal movement in the vertical plane includes a horizontally extending bar fixed in a position adjacent said base plate and being engageable by said rectangular support frame to limit pivotal movement in one direction in the vertical plane.

8. A self-aligning cutter head assembly according to claim 1 wherein said resilient means for limiting pivotal movvement in the horizontal plane includes a chain connected in a fixed position at one end to said support means and connected at the other end to said rectangular support frame, and a tension spring connecting the fixed end of said chain to an intermediate portion thereof.

9. A self-aligning cutter head assembly according to claim 1 including inverted U-shaped guide rails fixed on said rectangular support frame and extending upwardly therefrom and being positioned adjacent opposite sides of said curved cutting and limb stripping levers and said curved guide levers and serving to guide a tree trunk into position between said curved cutting and limb stripping levers and said curved guide levers when in an open position.

10. A self-aligning cutter head assembly according to claim 1 and being particularly adapted for use with a knuckle boom loader, said knuckle boom loader including a grapple and a supporting frame, and wherein said cutter head assembly includes a frame extension fixed on said supporting frame, and wherein said support means for said rectangular support frame is fixed on said frame extension.

* * * * *

REEXAMINATION CERTIFICATE (2446th)

United States Patent [19]

Hamby, Jr.

[11] B1 4,749,012

[45] Certificate Issued Dec. 27, 1994

[54] SELF-ALIGNING CUTTER HEAD ASSEMBLY FOR DELIMBING TREES

[76] Inventor: Thomas E. Hamby, Jr., Rte. 1, Box 27A, Purlear, N.C. 28665

Reexamination Request:
No. 90/003,222, Oct. 19, 1993

Reexamination Certificate for:
Patent No.: 4,749,012
Issued: Jun. 7, 1988
Appl. No.: 59,604
Filed: Jun. 8, 1987

[51] Int. Cl.⁵ ............................................. A01G 23/00
[52] U.S. Cl. ................................... 144/2 Z; 194/343
[58] Field of Search ................ 144/2 Z, 3 D, 208 R, 144/335, 338, 340, 343

[56] References Cited

U.S. PATENT DOCUMENTS

| | | | |
|---|---|---|---|
| 3,183,949 | 5/1965 | Larson | 144/3 D |
| 3,398,774 | 8/1968 | Hahn | 144/2 Z |
| 3,443,611 | 5/1969 | Jorgensen | 144/2 Z |
| 3,572,410 | 3/1971 | McElderry | 144/2 Z |
| 3,596,690 | 8/1971 | Hamilton et al. | |
| 3,643,708 | 2/1972 | Lindblom | 144/2 Z |
| 3,690,351 | 9/1972 | Strickland et al. | |
| 3,735,786 | 5/1973 | Vit | |
| 3,763,904 | 10/1973 | Eynon | 144/2 Z |
| 3,797,539 | 3/1974 | Moser et al. | |
| 3,809,134 | 7/1974 | McCabe | 144/2 Z |
| 3,881,532 | 5/1975 | Jouppi | 144/2 Z |
| 3,905,407 | 9/1978 | Guy et al. | 144/2 Z |
| 3,974,866 | 8/1976 | Saarenketo | |
| 3,981,336 | 9/1976 | Levesque | 144/2 Z |
| 4,034,785 | 7/1977 | Tucek | 144/2 Z |
| 4,049,032 | 9/1977 | Oldenburg et al. | 144/2 Z |
| 4,050,486 | 9/1977 | Whitcomb | 144/2 Z |
| 4,083,463 | 4/1978 | Ericsson | |
| 4,114,666 | 9/1978 | Bruun | 144/2 Z |
| 4,124,047 | 11/1978 | Dressler et al. | 144/2 Z |
| 4,194,542 | 3/1980 | Eriksson | |
| 4,258,762 | 3/1981 | Belanger | 144/2 Z |
| 4,462,438 | 7/1984 | Gaudreaut | 144/2 Z |
| 4,620,578 | 11/1986 | Verrill et al. | 144/2 Z |

*Primary Examiner*—W. Donald Bray

[57] ABSTRACT

The present cutter head assembly includes guide lever members engageable with the trunk of the tree so that the curved cutting and limb stripping blades are maintained parallel with the longitudinal axis of the tree as the tree is pulled through the cutter head assembly by the grapple of a knuckle boom loader or the like. The cutter head assembly includes a rectangular support frame with a pair of curved cutting and limb stripping blades pivotally supported for movement toward and away from each other and adjacent one end of the rectangular support frame. The stripping blades define a tree encircling cutting opening therebetween for longitudinal movement of the three in one direction through the cutting opening. A pair of curved guide levers is pivotally supported for movement toward and away from each other and adjacent the other end of the rectangular support frame. The rectangular support frame is supported for a limited amount of provided movement in both vertical and horizontal planes so that the support frame and the curved stripping blades and guide levers are automatically maintained in alignment with the tree trunk so that the axial alignment of the cutter head is not dependent upon the skill of the operator of the knuckle boom loader.

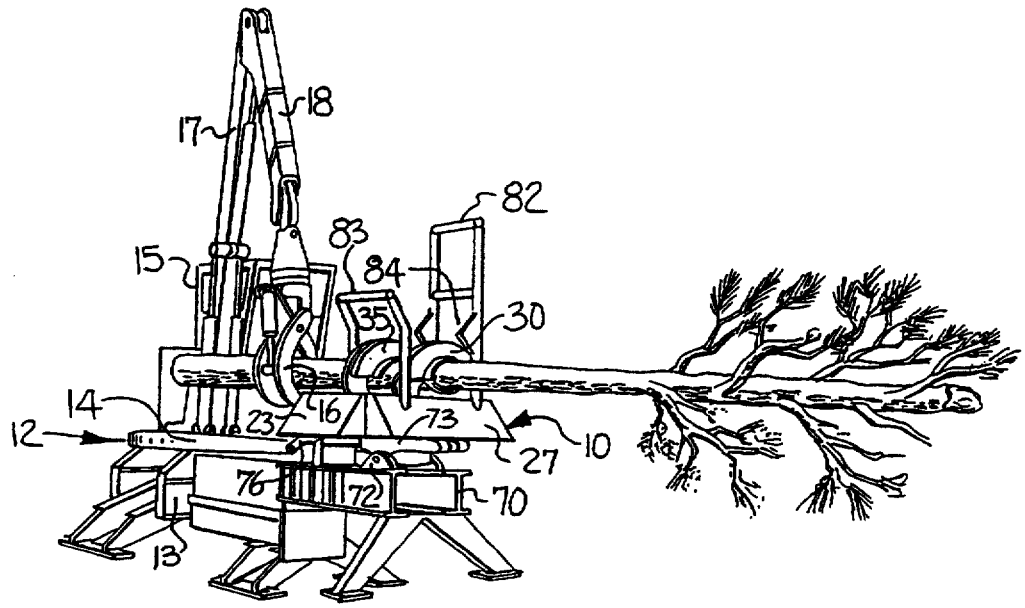

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

* * * * *